June 26, 1934.  F. POPPENSIEKER  1,964,213

TURRET BEARING FOR AUTOMATIC MULTISPINDLE TURRET LATHES

Filed Oct. 22, 1932  2 Sheets-Sheet 1

June 26, 1934.   F. POPPENSIEKER   1,964,213
TURRET BEARING FOR AUTOMATIC MULTISPINDLE TURRET LATHES
Filed Oct. 22, 1932   2 Sheets-Sheet 2
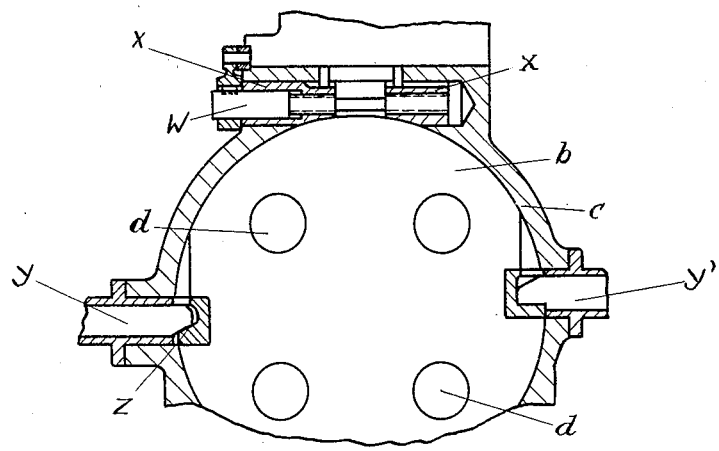
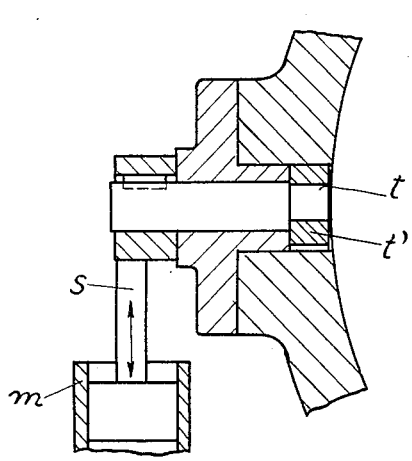
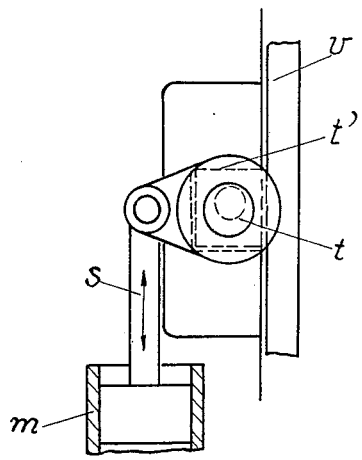
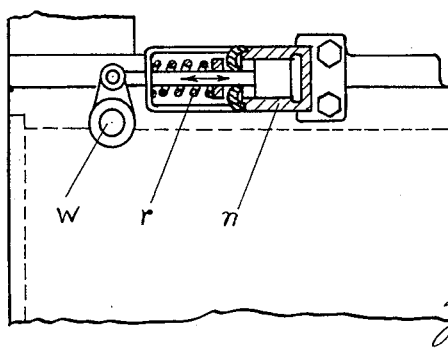

Patented June 26, 1934

1,964,213

UNITED STATES PATENT OFFICE 1,964,213

TURRET BEARING FOR AUTOMATIC MULTI-SPINDLE TURRET-LATHES

Fritz Poppensieker, Cologne, Germany, assignor to the firm Alfred H. Schutte, Cologne-Deutz, Germany Application October 22, 1932, Serial No. 639,111
In Germany October 24, 1931

4 Claims. (Cl. 29—37)

Upon automatic multispindle turret-lathes the drum containing the tool head spindles or working head spindles must be supported in the drum-housing with a certain play. The friction of the revolving spindles, more or less rapidly generate heat, which is transmitted to the drum and causes its expansion. Furthermore, a certain tolerance for the rotation of the drum itself has to be considered, and, finally the play will be increased through normal wear.

It is obvious that this play of the drum is of considerable influence upon the accuracy of the work pieces. In order to overcome this disadvantage, the drum up to now has been clamped in every indexing position by two clamping bolts, one opposite to the other, ensuing a bearing without tolerance. One bolt or both of them are provided with wedgeshaped pressure surfaces, pressing the drum against the wall of the housing in one direction. By these means, the radial play of the drum can be eliminated.

But the axial tolerance necessary to allow the spindles to rotate, too, will detract considerably the accuracy and the finish of the machined pieces. Every wandering, even the slightest, of the spindle in its axial direction produces inaccuracies and marks or unclean surfaces intolerable under the modern requirements on automatic lathes. Particularly, steps cannot be avoided when recessing grooves or when cutting-off by the lateral slides. Furthermore, there has to be considered that the tools may be damaged when pieces with straight-flanged grooves have to be produced by operation of the cross slides. Similar inaccuracies are effected when producing profiled borings by movement of the longitudinal slide.

By the present invention the above-mentioned disadvantages are overcome. The invention consists in novel means insuring the possibility of pressing the drum in every indexing position against an axial thrust bearing by a special clamping device, thus avoiding the inaccuracies derived from the axial play. It is desirable to arrange for this fixing of the drum and its fixation in the indexing position by means of hydraulic members which may be controlled, by a special cam cylinder. In certain cases the same oil pressure tubings may serve for producing, besides the axial clamping of the drum, its radial fixing in a manner that allows the drum to be primarily pressed into the axial clamping position, the clamping in the radial direction being then effected.

One embodiment of the invention is shown by way of example in the accompanying drawings, wherein:

Figure 3 is an enlarged section through that part of the apparatus used for effecting clamping of the drum longitudinally.

Figure 4 is a view at right angles to Fig. 3 and showing certain of the parts in elevation.

Figure 5 is an enlarged transverse section through the tool head showing the means for clamping the drum in radial direction.

Figure 6 is a side elevation, partly in section, showing the means for actuating the clamp of Figure 5.

Figure 1:
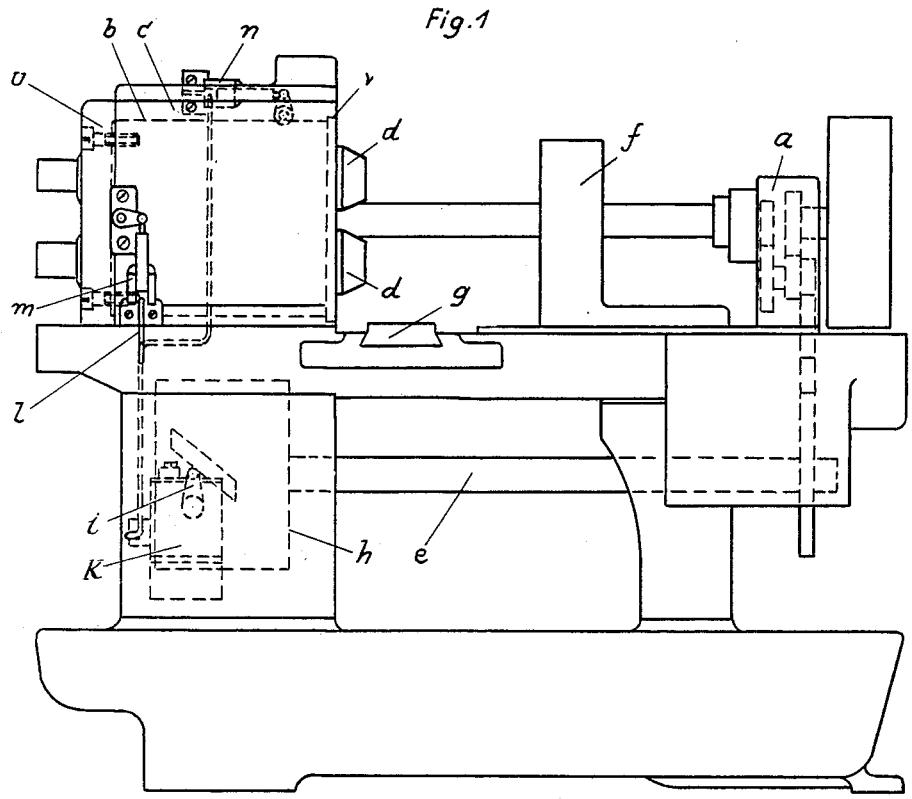
Figs. 1 and 2 are respectively the front and side views of a multiple spindle turret-lathe constructed in accordance with the invention.

The work spindles $d$ which are supported in the spindle drum $b$ in the housing $c$, are driven from the gearing $a$. Furthermore, the shaft $e$ moves the longitudinal slide $f$ and the pair of cross slides $g$ by means of transmission elements which are not shown in the drawings. Indexing of spindle drum $b$ from one working position to the next is effected equally by shaft $e$ on which is a cam cylinder $h$ by which, after the indexing of the drum is finished, the axial and radial clamping of the drum is effected. As an example, by suitable inclined surfaces or cams on the cylinder $h$ a lever $i$ on receptacle $k$, containing the hydraulic pressure liquid, is shifted into the one extreme position, whereupon the pressure means produce the clamping of the drum in a way which will be described later on.

Figure 2:
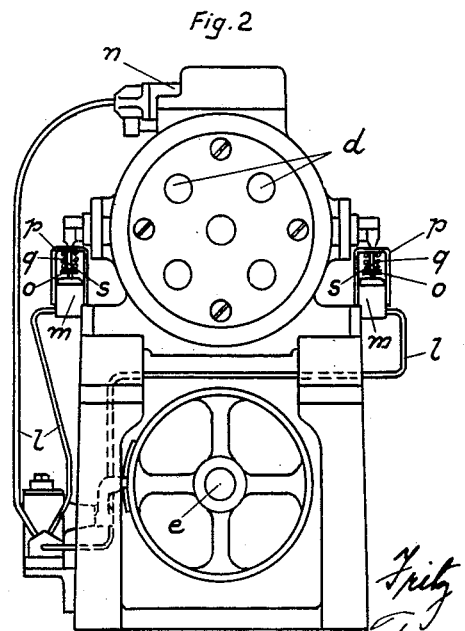

As soon as the working operation is finished, the lever $i$ is shifted into its final position by an inclined surface or cam which is not shown in the drawings. Thereby the drum $b$ is released from the clamping devices, allowing it to index to the next working position. The pressure liquid contained in receptacle $k$ is conducted by tubing $l$ to the clamping cylinders $m$ (see also Figs. 3 and 4) for holding the drum in axial direction, and to cylinder $n$ (see also Fig. 6) for the clamping the drum without play in radial direction. Between the ring $o$ (Fig. 2) which is arranged upon the piston rod $s$ of the piston moving in the cylinders $m$, and the yoke $p$, connected with these cylinders, there is arranged a spring $q$. In a similar way the piston moving in cylinder $n$ (Fig. 6), which produces the clamping in the radial direction, receives pressure from spring $r$. The spring $r$ is chosen stronger than the springs $q$, so that when the pressure occurs simultaneously in the three cylinders $m$ and $n$, the pistons situated in the cylinders $m$ are shifted against the weaker springs $q$, until the pressure of the liquid becomes equal to the tension of the stronger spring $r$, pressing then the piston in the cylinder $n$ into the clamping position. Thus the radial fixing of the drum is executed in timed relation to the clamping without play in the axial direction. After finishing the working operation, the pressure pistons are released from pressure by shifting lever $i$ (Fig. 1) thus permitting the springs $q$ and $r$, to effect movement of the clamping devices from the clamping position.

The axial clamping of the spindle drum (Figs. 3 and 4) is done by the excentric $t$ and its head $t'$ which, when the pressure liquid flows into the cylinder $m$ and, therefore, when the piston rod $s$ is moving upwards, is pressed against a flange $u$ of the spindle drum $b$, so that its frontal collar $v$ (Fig. 1) bears against a corresponding dog of the drum housing $c$.

The fixing of the drum in the radial direction, following shortly after the clamping in the axial sense, is done by turning the shaft $w$. Upon this shaft the clamping dogs $x$ are arranged by threads with contrary pitch, and are pressed symmetrically upon the drum, the dogs having tapered surfaces which are in accordance with the curvature of the drum and are pressing it always against the same section of the drum housing $c$.

After the drum has indexed it firstly will be secured against rotation by the bolts $y$, $y'$ as shown in Fig. 5. The bolt $y'$ serves as a stop, whereas the bolt $y$ when engaging with the wedge-formed pressure surface presses the drum $b$ downward against the wall of the housing $c$. The disengaging of the bolts $y$, $y'$, which are preferably counterpressed by springs, is done automatically by the cam cylinder of the machine. After this fixing is done, the pressure liquid is driven automatically to the clamping cylinders by means of a turning of the shaft $e$, with the effect that the drum is at first pressed tightly into its final position in the axial direction, whereupon by means of the clamping dogs $x$ an additional clamping in the radial direction takes place, relieving to a certain amount stresses on the fixing bolts $y$, $y'$. By this construction the different spindles always occupy in every working position the same positions in space without hampering the indexing of the drum during the intervals between working operations. By these means it is possible to produce parts of the utmost accuracy even upon multiple spindle automatics, as the small deviations which were heretofore unavoidable with this kind of machines are eliminated with a construction in accordance with the invention.

What I claim is:

1. An automatic multi-spindle lathe comprising a carrying frame and a drum housing, a rotating drum in said drum housing, an abutment cooperating with the drum, pressure members movably supported by the drum housing and arranged to press the drum after each setting in axial direction against said abutment, other means for clamping the drum in radial direction after the axial clamping has been effected, hydraulic operating means for said axial and radial clamping means, and a control device for effecting operation of the hydraulic means of the axial and radial clamping means in timed succession.

2. An automatic multi-spindle lathe comprising a carrying frame and a drum housing, a rotating drum in said drum housing, an abutment cooperating with the drum, at least two pressure members arranged at the rear end of the drum and uniformly distributed about the circumference, said pressure members being movably mounted in the drum housing and pressing the drum after each partial revolution in axial direction against said abutment, and means for also clamping the drum in radial direction after the axial clamping has been effected.

3. An automatic multi-spindle comprising a carrying frame and a drum housing, a rotating drum in said drum housing, an abutment cooperating with the drum, pressure members to press the drum after each partial revolution in axial direction against said abutment, other means for clamping the drum in radial direction after the axial clamping has been effected, hydraulic actuating devices for the means for axial and radial clamping, a control cam for controlling the hydraulic devices, and release springs for the clamping means, the springs for the axial clamping means being weaker than the springs for the radial clamping means.

4. An automatic multi-spindle lathe comprising a carrying frame and a drum housing, a rotating drum in said drum housing, an abutment cooperating with said drum, pressure members supported by the drum housing to press the drum in axial direction against said abutment, other means for clamping the drum in radial direction after the axial clamping has been effected, said other means consisting of a shaft provided with a right-handed thread and a left-handed thread, two clamping members mounted on said shaft, levers fixed on the shaft to rotate said shaft, hydraulic means for shifting the pressure members and turning the threaded shaft, and a control cam controlling the action of said hydraulic means.

FRITZ POPPENSIEKER.